Patented Dec. 12, 1922.

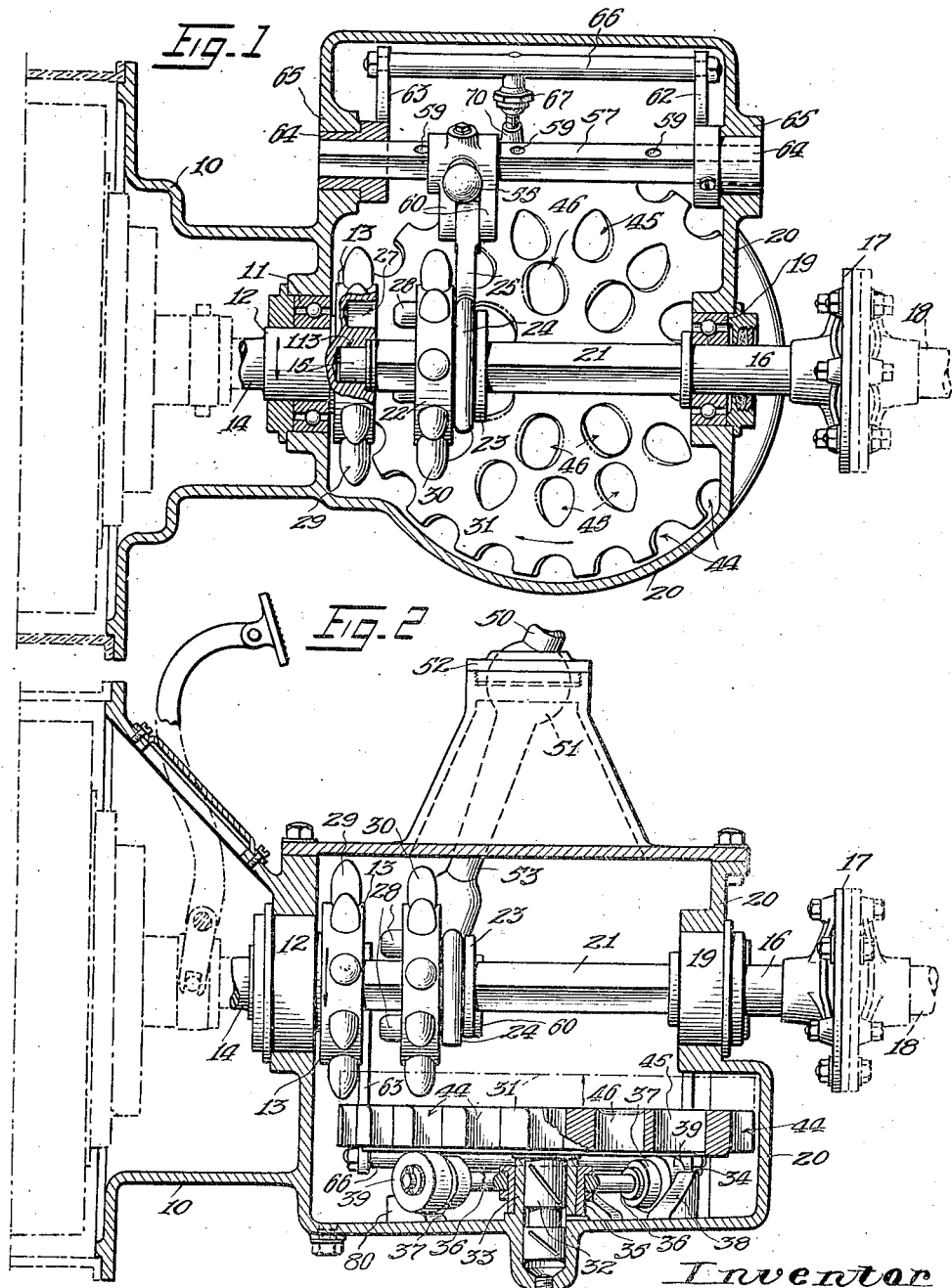

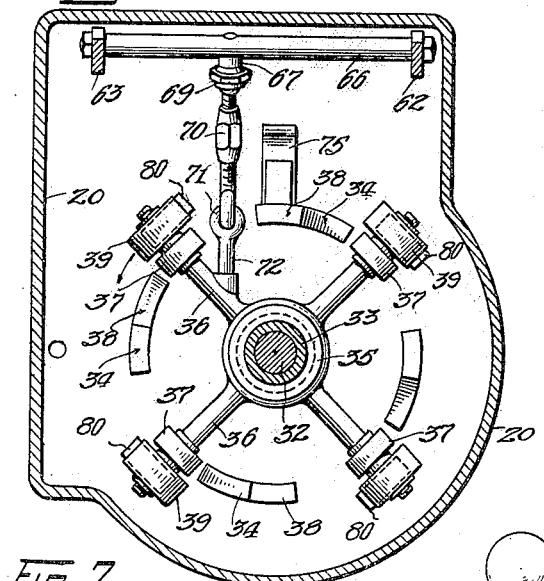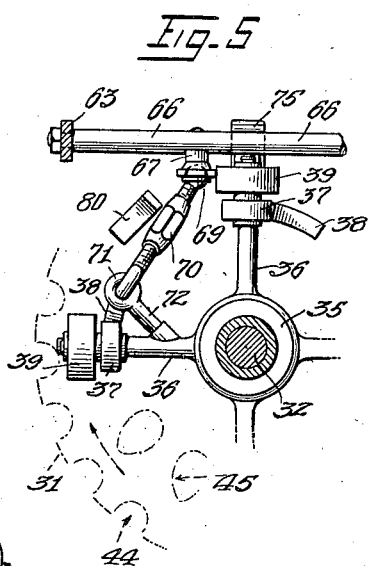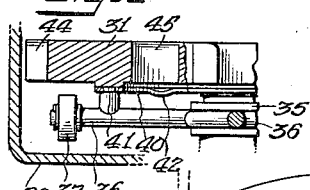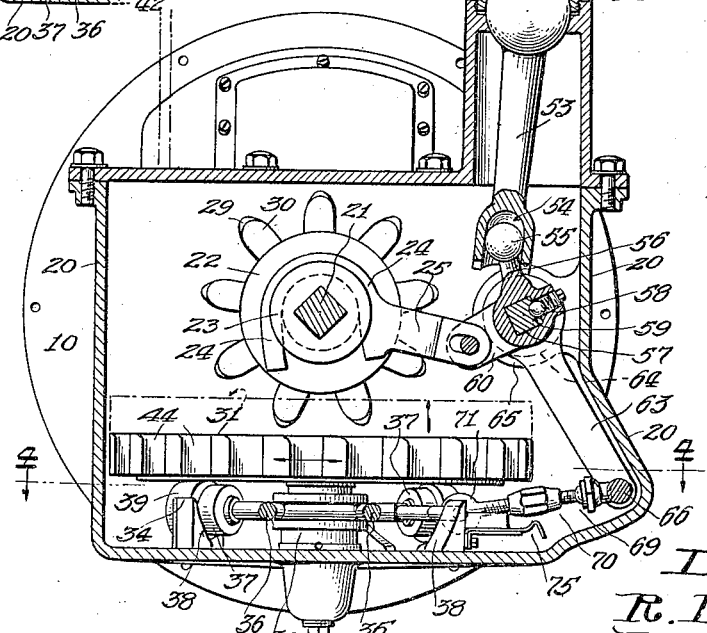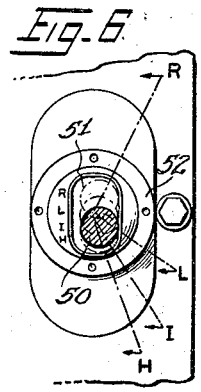

1,438,444

UNITED STATES PATENT OFFICE.

RUTLEDGE LOUAT, OF SYDNEY, NEW SOUTH WALES, AUSTRALIA.

MANUALLY-CONTROLLED VARIABLE-SPEED-TRANSMISSION GEARING.

Application filed August 2, 1921. Serial No. 489,333.

*To all whom it may concern:*

Be it known that I, RUTLEDGE LOUAT, a subject of the King of Great Britain and Ireland, residing at 375 George Street, Sydney, New South Wales, Australia, have invented certain new and useful Improvements in Manually-Controlled Variable-Speed-Transmission Gearing, of which the following is a specification.
This invention relates to manually controllable transmission gearing for varying the relative rate of rotation of a driven shaft in relation to a driving shaft, and it has been primarily designed for use in automobile equipment in which, ordinarily, means are provided for varying the speed ratio in relation to engine rotations.

The driven shaft is disposed as an axial extension of the driving shaft and is maintained in concentric alignment therewith by means of a spigot bearing. A change wheel is movable axially on a splined or castellated portion of the forward end of the driven shaft, and means are provided for manually shifting the change wheel along the splined or castellated shaft to bring it to meshing position with a transfer wheel and to engage it for direct drive to the driving shaft through a master gear wheel thereon. In the direct drive arrangement the change wheel is locked to the master wheel and the driven shaft is then turned directly by the driving shaft without the intermediary of gearing between those shafts. But for procuring a relatively slower rate of rotation in the driven shaft than in the driving shaft or reversed rotation of the driven shaft, the change wheel on the splined or castellated part of the driven shaft is slid backward to an appropriate position thereon and is then engaged to a transfer wheel; said transfer wheel is also engaged under the like conditions with the master wheel. Intermediate, low, or reverse drive are thus obtained according to the wheel relations. The transfer wheel is mounted on an axis at right angles to the axis of the driving and driven shafts.

It is movable transversely of those shafts and preferably in a vertical plane and supported on slides or rollers. When disengaged from the master wheel and the change wheel, the transfer wheel remains at rest, but under all conditions of intermediate, low, and reverse drive it is brought to the raised position in which it is engaged with the master wheel and the change wheel. The master wheel and the change wheel are pin-tooth wheels, that is to say their teeth are circular in section, and stand out from the wheel body radially, and are rounded at their ends so as to facilitate their meshing with the "teeth" of the transfer wheel. The transfer wheel is armed with "hole teeth" the holes being disposed in concentric ring order, the holes in each ring being shaped to engage with minimum friction the pin teeth of the master wheel and the pin teeth of the change wheel respectively. A manually controlled device is arranged to perform the double action of bringing the change wheel to the required position on the splined or castellated part of the driven shaft and for moving the transfer wheel to engaged or disengaged position, the transfer wheel movement being always effected before the axial movement of the change wheel has begun and after it has finished.

The complete gear adapted for delivery of forward drive at normal, intermediate, and low speed, and for reverse drive, consists, therefore, essentially of three wheels only, the transfer wheel having three concentrically disposed rings of hole teeth. Reverse drive is obtained when the change wheel is moved past the centre of the transfer wheel and engaged with the low gear ring of hole teeth in the transfer wheel.

In the accompanying drawings, Fig. 1 is an horizontal sectional plan through the gearing as arranged to be fitted in an automobile assembly;

Fig. 2 is a vertical sectional elevation corresponding with Fig. 1;

Fig. 3 is a transverse vertical sectional elevation through the gear box;

Fig. 4 is a horizontal section on the plane 4—4 Fig. 3;

Fig. 5 is a fragmentary view corresponding with Fig. 4 and indicating the altered position of the transfer wheel carrier devices as they appear when the transfer wheel is in the raised position and the gear is operating on intermediate, low, or reverse;

Fig. 6 is a fragmentary horizontal section above the manual lever bearing indicating the lever positions for the several gear settings; and Fig. 7 is a fragmentary view indicating the substitution of a slide support instead of roller support for the transfer wheel.

10 is a housing adapted for fixing at its forward flange to the rear part of the clutch and fly wheel casing of a conventional automobile engine set, the elements of which projecting within the housing are indicated in dotted lines. The housing 10 contains a neck bearing 11 for the outboard end 12 of the engine clutch shaft 14 on which the primary or "master" wheel is keyed. The body of the master wheel 13 contains a spigot bearing 113 for the forward end 15 of the intermediate shaft 21, which is splined or castellated and is connected by a coupling 17 to the driven shaft 18 and is essentially a part of the driven shaft 18. The rear end 16 of the intermediate shaft 21 is carried in a neck bearing 19 which is contained in the gear casing 20 which is integral with the housing 10 or may be bolted up to said housing as shown. The eye of the change wheel 22 is broached to slide axially on the intermediate shaft 21. It is formed with a collar 23 engageable by a bracket fork 24, said bracket fork being carried on an arm 25 associated with the manual change mechanism which will be described later.

The body of the master wheel 13 is formed with pockets 27 to engage dog clutch dowels 28 on the body of the change wheel 22, but any other appropriate dog clutch device may be used instead of the dowel pin and hole device 27—28 shown. The master wheel 13 and the change wheel 22 are armed with pin teeth 29 and 30 respectively. These teeth are circular in section and their ends are of spherical, elliptical, or similar tapered rounded form, and they are adapted to enter easily the hole teeth in the transfer wheel 31.

The transfer wheel 31 is a disc mounted on an axle or spindle 32 working in a bearing 33 in the bottom of the case 20, the axis of this wheel being disposed at right angles to the axis of the shafts 14 and 16. Upon the bottom of the case 20 three or more ramps 38 (four are shown) are provided; they are symmetrically disposed in relation to the bearing 33 and their ramp faces merge into flat heads 34. The outer portion of the bearing 33 forms an arbor which carries the eye 35 of a spider frame which, as shown, consists of four arms 36, the number of arms in the spider corresponding with the number of ramps 38. The spider arms 36 each carry a roller 37, these rollers being positioned to run on the ramp faces 38—34. 80 are stops fixed on the bottom of the case to be engaged to the rollers 39 to check the pull-off movement of the spider. On their ends beyond the ramp rollers 37 the arms 36 carry also riding rollers 39. These rollers 39 carry the transfer wheel 31. The transfer wheel 31 instead of being carried on the rollers 39 may be carried on a slide disc or slide ring 40 (Fig. 7) which is supported by studs 41 from the spider arms 36. Where a ring or disc 40 is used as the support for the transfer wheel, clearance spaces such as shown at 42 should be provided for access of lubricant. It is intended that the case shall be charged with a quantity of heavy oil or fluid grease, which will splash onto and work into all the bearing surfaces.

As shown in the drawings, the gear is arranged for through drive, intermediate drive and low drive direct, and for low drive reverse, the transfer wheel thus having three rings of hole teeth. The outer ring of hole teeth 44, may be formed as half teeth as shown, but if the case be enlarged to permit the fitting of a transfer wheel of larger diameter, the teeth 44 of the outer row may be full teeth so as to offer a better engagement for the pin teeth 29 of the master wheel 13 which intergear with them. The intermediate ring of hole teeth 45 and the inner ring of hole teeth 46 are also engageable by the teeth 30 of the change wheel 22. These hole teeth do not consist merely of notches or holes in the transfer wheel; they are appropriately shaped and flared to offer easy engagement for the transfer wheel and the pin wheel teeth. The shape and section of these "hole teeth" must therefore be carefully wrought out so that wasteful friction and impact will be minimized and as far as practicable entirely avoided.

The manual control device functions to change the vertical position of the transfer wheel 31 and to slide the change wheel 22 along the intermediate shaft 21. The manual gear consists of a hand lever 50 which may be fitted in a "joystick" mounting, that is to say with its fulcrum in a ball centre 51 contained in a spherical casing 52. The work end 53 of the lever 50 is formed with a pocket 54 engageable with the spherical head 55 on the power arm 56 of a throw lever. Said throw lever is slidably mounted on a squared or castellated rock shaft 57 and is located for position thereon by means of a ball-and-spring lock 58, the ball being engageable with cups 59 formed in the squared shaft 57. The work arm 60 of the throw lever is forked and embraces the wrist portion 25 of the claw 24, which claw, as before stated, embraces the collar 23 of the change wheel 22. At its ends, the squared shaft 57 carries two arms 62–63, the eyes of those arms forming centres 64 rotatable in journals 65 formed in the casing 20. At their outer ends the arms 62—63 are connected by a yoke 66. An arm 67 set at right angles on the bar 66 is connected through a ball and socket joint 69 and an adjustable-length link 70 through a universal joint 71 to an arm 72 branched from one of the spider arms 36. The arm 72 may be part of the spider construction, as the object of the linkage is to apply rotational movement to the spider responsively to the rocking movement of the bar 66. 75 is a spring latch arranged to engage the bar 66 and hold the spider against accidental movement whilst the gear is engaged in any working position.

As shown, rotational movement of the transfer wheel tends to resist the upward movement of the spider frame on the ramps. If the ramps be reversed in direction of rise, the transfer wheel rotation will tend to assist the spider frame movement in the engaging of the gears.

The mode of operation is as folllows:—

As shown in Figs, 1, 2, 3, 4, and 7 of the drawings, the gear is "in neutral." To set it for "direct forward drive", the clutch between the engine and the gear being first thrown out of engagement, the hand lever is pulled backward to the "H" position, Fig. 6. In this movement the fork 25 is caused to slide the change wheel 22 forward on the intermediate shaft 21, thereby to engage the dog-clutch 27—28. The engine clutch is then "let in". To change from direct forward drive to intermediate forward drive the engine clutch is freed and the hand lever 50 is thrown forward and then outward to the position marked "I" in Fig. 6. This movement has the effect, firstly of sliding back the change wheel 22 to the intermediate position in which it is shown in Figs. 1 and 2; the lateral component of the movement then operates to turn the shaft 57, and so through the linkage to move the spider from the position shown in Fig. 4 to the position shown in Fig. 5. In its movement to the latter position the rollers 37 are caused to mount the ramps 38 and to seat on the ramp flats 34. In doing this, the bearer rollers 39, or the bearer disc or ring 40 (Fig. 7) are raised, thereby shifting up the transfer wheel 31, so that the master wheel teeth 29 then engage the outer ring of transfer wheel hole teeth 44, whilst the change wheel teeth 30 engage the intermediate ring of hole teeth 45 in the transfer wheel 31. The clutch being now let in as before, the drive is transmitted from the master wheel via the transfer wheel to the change wheel and thence through the intermediate shaft 16 to the driven shaft 18. As the number of holes in the ring of teeth 45 is less than the number of teeth in the outer ring 44 a proportionate reduction in the relative rotative speed of the driven and driving shafts is obtained. It is, of course, necessary that the centreings of the hole teeth shall in all cases correspond in order that correct meshing will be ensured. The movement to effect a change to low speed drive is similarly performed, the change wheel teeth in this case gearing with the inner row of hole teeth 46. To obtain reverse drive, the change wheel 22 is moved further backward by the lever action past the centre of the transfer wheel until it is again in alignment with the ring of hole teeth 46, and when it is engaged therewith by the raising of the transfer wheel 31 the right hand motion of the engine shaft and the master wheel 13 becomes left hand motion of the intermediate shaft 16 and the driven shaft 18. The bell crank lever 56—60 is centred and latch-locked at each operating position, to prevent accidental slipping, by means of the spring ball latch device 58 and similarly the spider is latched by the spring 75. In direct drive the transfer wheel remains idle, whilst in the intermediate, low, and reverse arrangements, the transfer wheel is brought into gear by being raised towards the main shaft centre so that the master wheel and change wheel teeth are engaged in the hole teeth in the transfer wheel. So long as either of those wheels comes into engagement with the transfer wheel hole teeth, the other of them must come into engagement with another ring of teeth therein, inasmuch as the pitch centres are indentical. The gear can be "felt" into place by deft handling of the gear lever so that risk of jambing the gear by contacting the ends of the pin teeth on the sides of the hole teeth can be practically avoided in use.

What I claim as my invention and desire to secure by Letters Patent is:—

1. A variable speed gear comprising a clutch shaft, a driven shaft in alignment therewith, a pin spur tooth master wheel on the end of the driven shaft, a pin spur change gear wheel slidably carried on a castellated portion of the driven shaft, a transfer wheel, concentric rings of hole teeth in said transfer wheel and adapted to mesh with the pin teeth of said master wheel and of said change gear wheel, a journal bearing for said transfer wheel at right angles to the axis of said master wheel, a spider frame centered on said journal, roller carriers on said spider frame, ramps adapted to engage said roller carriers, and a riding bearing on said spider frame for said transfer wheel.

2. In a variable speed gear as defined in claim 1 manually operable means for moving said roller carriers on said ramps substantially as described.

In testimony whereof I affix my signature.

RUTLEDGE LOUAT.